United States Patent [19]

Knight et al.

[11] Patent Number: 4,619,848

[45] Date of Patent: Oct. 28, 1986

[54] COMPOSITIONS AND METHODS FOR SEALING CONTAINERS

[75] Inventors: John R. Knight; Geoffrey R. Thwaites, both of Cambridge, England

[73] Assignee: W. R. Grace & Co., Cambridge, Mass.

[21] Appl. No.: 598,145

[22] Filed: Apr. 9, 1984

[30] Foreign Application Priority Data

Apr. 25, 1983 [GB] United Kingdom ............... 8311138

[51] Int. Cl.$^4$ ..................... C08L 23/06; C08L 23/08; C08L 31/04
[52] U.S. Cl. ....................................... 428/35; 428/500; 524/490; 524/487; 524/524; 525/222
[58] Field of Search ................ 525/222; 524/490, 487; 428/35

[56] References Cited

U.S. PATENT DOCUMENTS

| | | | |
|---|---|---|---|
| 3,182,101 | 5/1965 | Rees | 260/885 |
| 3,245,930 | 4/1966 | McDowell et al. | 260/28.5 |
| 3,422,055 | 1/1969 | Maloney | 260/41 |
| 3,615,106 | 10/1971 | Flanagan et al. | 281/21 |
| 3,644,254 | 2/1972 | Dew | 260/28.5 |
| 3,896,069 | 7/1975 | Kosaka et al. | 525/222 |
| 4,198,369 | 4/1980 | Yoshikawa et al. | 264/268 |
| 4,261,475 | 4/1981 | Babiol | 215/341 |

FOREIGN PATENT DOCUMENTS

| | | |
|---|---|---|
| 1092161 | 11/1967 | United Kingdom . |
| 1112023 | 5/1968 | United Kingdom . |
| 2037793 | 7/1980 | United Kingdom . |

Primary Examiner—Carman J. Seccuro
Attorney, Agent, or Firm—Stacey L. Channing; William L. Baker

[57] ABSTRACT

A sealing gasket for the inner surface of a container closure is formed, generally by melt application, of a composition which comprises a blend of 55 to 99% ethylene vinyl acetate copolymer having a vinyl acetate content of less than 25% and a melt index above 300 and polyethylene having a melt index above 200.

9 Claims, No Drawings

COMPOSITIONS AND METHODS FOR SEALING CONTAINERS

It is well known to use ethylene vinyl acetate copolymers as components of hot melt adhesives and as components of thermoplastic compositions for forming sealing gaskets between a container closure and a container. It is also known to blend such copolymers with polyethylene or polypropylene or other materials, for instance as described in British Patent Specification No. 1,092,161.

It is possible to obtain ethylene vinyl acetate copolymers having a wide range of melt indices and having a wide range of vinyl acetate contents. Likewise it is possible to use polyethenes having a wide range of melt indices. The compositions may be formulated with various additives to facilitate blending and improve the properties of the final compositions either as adhesives or sealants.

Although it is stated in British Specification No. 1,092,161 that the ethylene vinyl acetate copolymer may contain 15 to 40% copolymerised vinyl acetate, in each of the examples the amount is 27% or higher. The melt indices that are quoted in the examples range from 405 down to 25, this indicating a high molecular weight material. The compositions are stated to always contain 5 to 75 parts of a compatible resin and in each of the examples the amount of resin is always at least 30%, and often 100%, based on the amount of copolymer.

The presence of large amounts of resin facilitates blending of the composition but the physical properties of the resultant compositions, especially when they are to be applied by melt application, are not entirely satisfactory.

According to the invention a sealing gasket for the inner surface of a closure for a container is formed of a composition which comprises a blend of 50% to 99% ethylene vinyl acetate copolymer and 1 to 50% (both percentages being by weight of the blend) polyethylene and the copolymer has a vinyl acetate content of less than 25% by weight and a melt index above 300, and the polyethylene has a melt index above 200.

The amount of ethylene vinyl acetate copolymer in the blend is generally 60 to 95%, preferably 70 to 90% and most preferably 80 to 88% by weight, with the remainder of the blend being provided by the polyethylene.

The melt index of the ethylene vinyl acetate copolymer is generally above 420, preferably above 480 and most preferably is between 500 and 600 although it can be higher. The melt index of the polyethylene is generally at least 300, preferably 400 to 1000 and most preferably 500 to 700. In general the polyethylene can be regarded as having an average molecular weight below about 19,000 and the molecular weight may be so low that the polyethylene can correctly be referred to as a polyethylene wax. The polyethylene may be a blend of polyethylenes, preferably a blend of polyethylene wax as a diluent with a higher molecular weight polyethylene, for instance having a melt index of 200 to 300 as a hardening component. The proportions in the blend are generally between 10:1 and 1:10, preferably 3:1 to 1:3.

The vinyl acetate content of the ethylene vinyl acetate copolymer is generally from 5 to 20%. The amount is preferably at least 10%. The amount is preferably below 20%, e.g. up to 15%.

Preferred compositions comprise a blend of 60 to 95% by weight ethylene vinyl acetate copolymer having a vinyl acetate content of 5 to 19% and a melt index above 420, together with 5 to 40% polyethylene having a melt index above 400.

The use of the ethylene vinyl acetate copolymer alone results in a composition that is too soft for use as a sealing gasket but we overcome this by blending the copolymer with low molecular weight polyethylene so as to harden the blend without substantially increasing its viscosity when molten, and we ensure good compatibility between the copolymer and the polyethylene by having a low, below 25%, vinyl acetate content in the copolymer. Accordingly homogeneous blends can readily be obtained without the need to incorporate in the compositions large amounts of tackifying resins.

The amount of the blend in the thermoplastic composition is generally at least 50%, preferably at least 75% and most preferably 85 to 99% by weight of the organic components of the composition. Other thermoplastic materials may be included in the composition in lesser amounts provided they are compatible with the blend.

Although it is often preferred that the composition is free of plasticizing resin some may be included provided the amount is not so great as to impair the properties of the composition. Normally the amount is below 25% and preferably below 15% with best results being obtained when the amount is below 8%, for example 1 to 5%.

Suitable plasticising resins that may be included in small amounts include hydroabietyl alcohol, terpene resin, glycerol ester of wood rosin-maleic anhydride adduct, hydrogenated, disproportionated or polymerised wood rosin, polyhydric alcohol esters of abietic acid or of hydrogenated wood rosin.

The polyhydric alcohol ester is usually a glycerol, ethylene glycol, diethylene glycol, or pentaerythritol ester. The pentaerythritol ester of hydrogenated wood rosin (often called merely "rosin" instead of "wood rosin) can for example be the stabilised form available as Hercules Resin Pentalyn H. The polyhydric alcohol esters of abietic acid can conveniently be employed in the form of esterified wood rosin, since wood rosin contains a large proportion of abietic acid. Derivatives of wood rosin, i.e. hydrogenated, disproportioned or polymerised wood rosin, can also be used as the resin component. Preferred examples of the resin component are the glycerol ester of abietic acid, the ethylene glycol ester of abietic acid, and the diethylene glycol ester of abietic acid, particularly the glycerol ester of abietic acid.

The molecular weight of the resin is generally from 300 to 3000.

A slip aid may be included in the composition, generally in an amount of below 20% and preferably below 10%. Best results are generally obtained with from 0.2 to 5%, most preferably 1 to 3%, by weight of the organic components of the composition.

The slip aid may be a conventional silicone slip aid, a hydrogenated castor oil wax or a fatty amide, for instance an aliphatic amide in which the aliphatic group contains 10 to 30, preferably 14 to 25, carbon atoms, for instance being stearamide or oleamide.

The composition generally consists only of organic components but if desired may include non-fusable materials such as titanium dioxide, china clay or other inorganic pigments or fillers. If non-fusable material is present its total amount is normally below 10% and most usually below 5%, based on the weight of organic components, for instance 0.5 to 3% by weight.

The composition may include other minor components for example antioxidants. The total amount of such other minor components is generally below 10%, preferably below 5%, by weight of the organic components of the composition.

The compositions can be used for forming sealing gaskets for a wide variety of containers including cans jars, drums and, especially, screw top containers, that is to say containers fitted with screw on or roll on caps or other closures. The gaskets may be used for sealing containers that are filled hot or are pasteurised after filling but preferably the gaskets are used for sealing containers that are not heated, and in particular for sealing pressurised containers, for instance for carbonated soft drinks. Naturally if the container is heated after sealing the conditions of heating must not be such as to damage the gasket. The compositions are of particular value when the closure is a screw on or roll on cap. This may be formed of aluminium or other metal but preferably is of polypropylene or other plastic material.

The composition may be preformed into a gasket of the desired shape and then applied to the container closure or the gasket may be formed by hot moulding a solid insert of the composition, for instance obtained by chopping a piece from a solid rod of the composition and laying it in the closure and hot moulding it to the desired configuration. Preferably however the composition is applied to the closure as a melt, by extrusion from a nozzle onto the surface of the closure, generally while it is spinning.

The composition preferably has a viscosity at 172° C. (a typical extrusion temperature for melt application) measured at a shear rate of 237 sec$^{-1}$ of from 50 to 400 poise. Under these conditions the viscosity is preferably below 300 and most preferably below 200 poise and is preferably at least 100 poise. It is generally preferred, especially when the composition is to be applied as a melt, when the viscosity under the defined conditions is between 110 and 180 poise, most preferably 130 to 170 poise.

When the gasket is a gasket for a screw closure (including both screw on caps and roll on caps) it is necessary that it would give an adequate seal at a satisfactory removal torque. If the removal torque is too high it is not conveniently possible to remove the cap by hand screwing. If it is too low it may become dislodged accidentally. Preferably the removal torque is from 6.5 to 19.5 cm.kg, when measured as defined below and most preferably it is less than 15.5, and preferably less than 13, cm.kg with preferred removal torque being 8 to 10 cm.kg.

The effectiveness of a seal can be determined by measuring the venting pressure, as herein defined. Preferably the compositions are such as to give a venting pressure of at least 10.5 kg/cm$^2$.

The venting pressure and removal torque values are determined on a standard gasket. This is a gasket obtained by extruding the composition at 175° C. through a nozzle onto the inner surface of a 28 mm diameter polypropylene screw cap. If an annular gasket is required, the nozzle directs the composition to one side of the cap while the cap is spinning at about 3,500 r.p.m. The gasket weight is then 200–250 mg. If an overall gasket is required the nozzle directs the composition to the centre of the cap while the cap is rotating at about 5500 r.p.m. The gasket weight is then 350–400 mg.

Venting pressure is recorded using the Owens-Illinois Secure Seal Tester. A polyethylene terephthalate bottle neck is fitted by a pressure-tight fixing to a bottle base in the Tester, so as to form a bottle. The lined cap is screwed onto the test bottle by a conventional capping machine set at a head load of approximately 40 kg and a closing torque of 10–15 cm.kg.

A compressed air line leads to a needle fitted in the bottle base so as to permit compressed air to be forced into the bottle. The bottle, including the screw cap, is immersed in water and the water is observed, as the pressure in the bottle is increased, for the escape of air from the cap. Air pressure is gradually increased stepwise at a controlled rate. The pressure is released 10 seconds after 14 kg/cm$^2$ has been reached. If venting from the cap is observed the test is halted and the pressure recorded. If no venting has been recorded by 14 kg/cm$^2$ the cap is recorded as having a venting pressure of 14+ kg/cm$^2$.

After the venting pressure test has been finished the plastic bottle top, with the cap attached, is removed and is clamped in a Kork-a-Torque tester with which the torque required to remove the cap from the bottle is measured.

The following are examples of the invention. Parts are by weight.

EXAMPLE 1

85 parts of ethylene vinyl acetate copolymer having a melt index of 530 and containing 19% vinyl acetate is blended with 15 parts of polyethylene wax having a melt viscosity of 1.65 poise at 237 sec$^{-1}$ shear rate and 171° C., 1 part of titanium dioxide, 2 parts silicone slip aid and 0.2 parts thermal/stabiliser. The silicone slip aid is a 60,000 cS polysiloxane. The components are blended in a suitable mixer and are extruded, without addition of foaming gas, through a Nordson Foam Melt apparatus at a temperature of 175° C. The composition has a viscosity of 152 poise at 171° C. and 237 sec$^{-1}$ shear rate. The molten composition is extruded into nominal 28 mm polypropylene screw caps which are spun at 6,000 rpm. The deposited film weight, per cap, is 402 mg. Upon testing, as above, venting pressures of 10.5, 14+ and 14+ kg/cm$^2$ and removal torques of 12.1, 13.2 and 14.3 cm.kg are recorded. Accordingly this composition is satisfactory.

EXAMPLE 2

The process of Example 1 is repeated except that the amount of ethylene vinyl acetate is 80 parts, the amount of slip aid is 1 part and the amount of polyethylene wax is increased to 15.9 parts and 4.05 parts of a polyethylene with a melt index of 250 is included. The coating weight is 411 mg. Venting pressures of 14+ and 14 kg/cm$^2$ and removal torques of 15.4 and 13.2 cm.kg are recorded.

When this is repeated using 2 parts silicone slip aid, instead of 1 part, and a film weight of 365 mg venting pressures of 14+ kg/cm$^2$ are consistently recorded and the removal torque varies between 13.2 and 14.3 cm.kg.

When the process is repeated using 1 part silicone slip aid and 0.6 parts oleamide slip aid and a coating weight of 354 mg, the venting pressure is consistently recorded as 14+ kg/cm$^2$ and the removal torque as 7.8 cm.kg.

EXAMPLE 3

A composition is prepared from 70 parts ethylene vinyl acetate, 30 parts polyethylene wax, 1 part oleamide and 1 part thermal stabiliser and is deposited to form a gasket of 341 mg. The venting pressure is 14+ kg/cm$^2$ and the removal torque 7.8 cm.kg.

It is claimed:

1. A sealing gasket for the inner surface of a container closure comprising a thermoplastic composition which comprises a polymer blend consisting essentially of 60 to 95% by weight ethylene vinyl acetate copolymer having a vinyl acetate content of 5 to 19% by weight and a melt index above 420 and 5 to 40% by weight polyethylene having a melt index above 400.

2. A gasket according to claim 1 wherein the blend consists essentially of 70 to 90% by weight of the copolymer and 30 to 10% by weight of the polyethylene.

3. A gasket according to claim 1 wherein the melt index of the copolymer is between 420 and 600.

4. A gasket according to claim 1 wherein the polyethylene is a blend of polyethylene wax and higher molecular weight polyethylene.

5. A gasket according to claim 1 comprising 50 to 99% by weight of said blend, 0 to 25% by weight plasticizing resin, 0.2 to 20% by weight slip and 0 to 10% by weight non-fusible material.

6. A gasket according to claim 5 comprising 85 to 99% by weight of said blend, 0 to 8% by weight of said plasticizing resin, 0.2 to 5% by weight of said slip aid and 0 to 5% by weight of said non-fusible material.

7. A gasket according to claim 1 lined on the inner surface of a container closure.

8. A method of forming a sealing gasket on the inner surface of a screw closure for a container which comprises applying to said inner surface a molten thermoplastic composition comprising a polymer blend consisting essentially of 60 to 95% by weight ethylene vinyl acetate copolymer having a vinyl acetate content of 5 to 19% by weight and a melt index above 420 and 5 to 40% by weight polyethylene having a melt index above 400.

9. The method of claim 8 wherein the molten thermoplastic composition comprises 50 to 99% by weight of said blend, 0 to 25% by weight plasticizing resin, 0.2 to 20% by weight slip aid and 0 to 10% by weight non-fusible material.

* * * * *